United States Patent
Wagner et al.

(10) Patent No.: US 9,430,885 B2
(45) Date of Patent: Aug. 30, 2016

(54) DETECTION OF ABSOLUTE VEHICLE MILEAGE MANIPULATION USING SATELLITE NAVIGATION DATA

(71) Applicant: GM GLOBAL TECHNOLOGY OPERATIONS LLC, Detroit, MI (US)

(72) Inventors: Nikolas Wagner, Eltville-Rauenthal (DE); Bruno Praunsmändel, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/460,155

(22) Filed: Aug. 14, 2014

(65) Prior Publication Data

US 2015/0048935 A1    Feb. 19, 2015

(30) Foreign Application Priority Data

Aug. 14, 2013    (DE) .................... 20 2013 007 352 U

(51) Int. Cl.
*G08B 21/00*    (2006.01)
*G07C 5/08*    (2006.01)
*G01C 22/00*    (2006.01)
*G07C 5/00*    (2006.01)

(52) U.S. Cl.
CPC ................. *G07C 5/08* (2013.01); *G01C 22/00* (2013.01); *G07C 5/008* (2013.01)

(58) Field of Classification Search
CPC ....................................................... G07C 5/08
USPC .................... 340/438; 701/468, 29.1, 32.5
See application file for complete search history.

(56) References Cited

U.S. PATENT DOCUMENTS

| | | | |
|---|---|---|---|
| 2003/0088348 A1* | 5/2003 | Gustavsson | G01C 22/02 701/29.1 |
| 2004/0093146 A1 | 5/2004 | Gustavsson et al. | |
| 2010/0191413 A1 | 7/2010 | Fritsch et al. | |

FOREIGN PATENT DOCUMENTS

| | | |
|---|---|---|
| DE | 20015676 U1 | 12/2000 |
| DE | 202007007694 U1 | 8/2007 |
| DE | 102009033040 A1 | 1/2011 |
| EP | 2466263 A1 | 6/2012 |

* cited by examiner

*Primary Examiner* — Jeffery Hofsass
(74) *Attorney, Agent, or Firm* — Ingrassia Fisher & Lorenz PC

(57) ABSTRACT

A device for determining if the absolute mileage of a vehicle has been manipulated is disclosed. The device includes a first sensor to determine a first absolute mileage of the vehicle and a second sensor to determine a second absolute mileage of the vehicle. The first and second sensors differ in terms of the sensor and computing method for determining the first and second absolute mileage. For example, the first sensor may be a convention mileage device and the second sensor may be a GPS-enabled device. A comparator determines a difference between the first and second absolute mileage. If the difference exceeds a prescribed limiting value, the comparator generates a warning signal, and stores this warning signal in the storage device. A display is used to display the first absolute mileage in the vehicle.

10 Claims, 1 Drawing Sheet

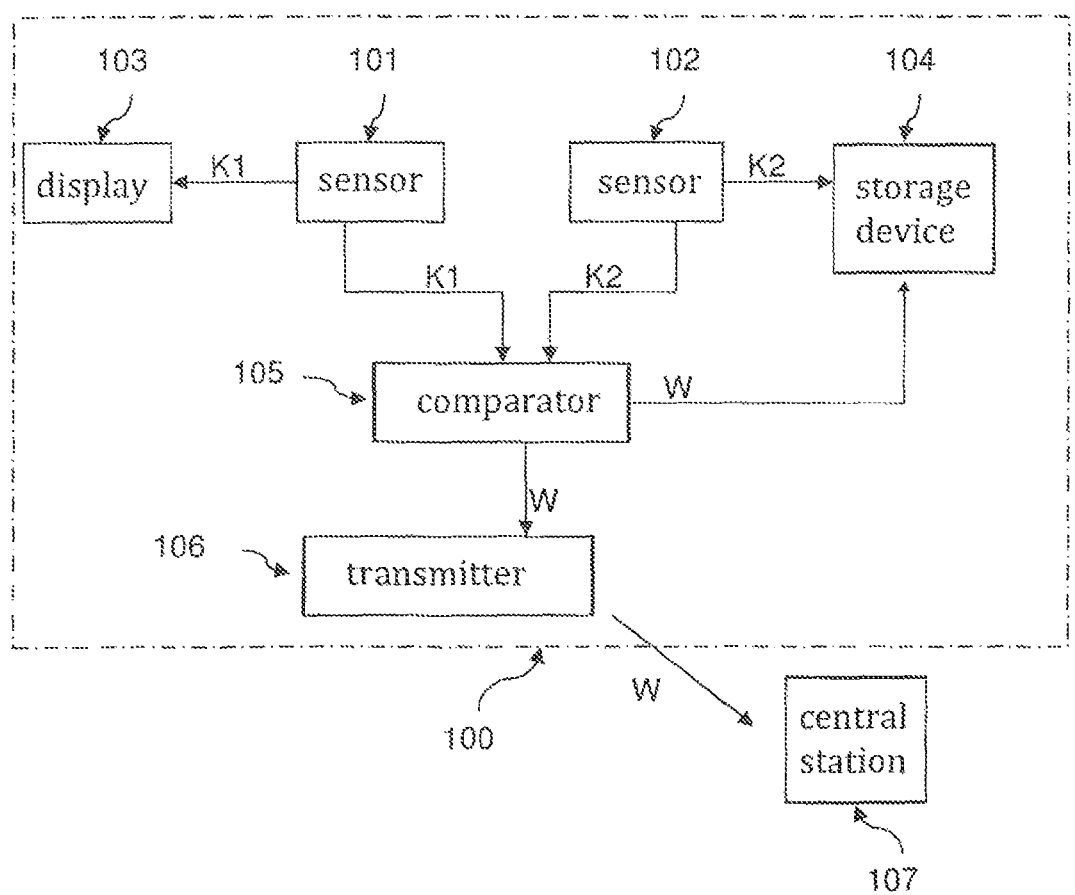

DETECTION OF ABSOLUTE VEHICLE MILEAGE MANIPULATION USING SATELLITE NAVIGATION DATA

CROSS REFERENCE TO RELATED APPLICATION

This application claims priority to German Patent Application No. 202013007352.7 filed Aug. 14, 2013, which is incorporated herein by reference in its entirety.

TECHNICAL FIELD

Described are a device and method for detecting when the absolute mileage of a vehicle has been manipulated.

BACKGROUND

Cases are known in which the absolute mileage of the odometer/tachometer/mileage counter of a vehicle was manipulated, for example to thereby mislead the buyer of a vehicle about the actual absolute mileage, for example in order to get a higher sales price. The term "absolute mileage" here refers to the overall miles traveled or accumulated mileage of the vehicle.

The odometer fraud laws vary significantly from one jurisdiction to another. For example, manipulatively changing the mileage had itself previously not been punishable in Germany. Accordingly, tradesmen had in recent years become specialized in altering odometer (tachometer) readings to suit for the right price. The introduction of paragraphs 22b of the Road Traffic Act (Misuse of Odometers and Speed Limiters) has now put a stop to this practice. Whoever manipulates tachometers in Germany is now guilty of an offense. This applies to both electronic and mechanical tachometers. Preparing for such tachometer manipulation through the manufacture, sale or provision of corresponding computer programs is also punishable. Even so, it must be assumed that criminal elements will continue to manipulate the absolute mileage of vehicles in this way in the future as well. Therefore, there is a need for detecting the manipulation of the absolute mileage of a vehicle as easily and reliably as possible.

A device is disclosed in DE 20 2007 007 694 U1 for correcting and calibrating the mileage of a vehicle filed in an automatically administered electronic logbook on a server with the help of a GPS (global positioning system) mobile radio telematic system with the displayed mileage in the vehicle. The described device includes the GPS mobile radio telematic system and a display and input device that is coupled with the box of this telematic system by way of a data link, and at least one display panel, card reader unit such as for smart or magnetic cards, along with keys for manual inputs.

SUMMARY

In accordance with the present disclosure, various embodiments make it possible to easily and reliably detect a manipulation of the absolute mileage of a vehicle. The features, possible applications and advantages may be gleaned from the following specification, as well as from the description of exemplary embodiments shown on the figures.

A device is disclosed for determining if the absolute mileage of a vehicle has been manipulated. This device includes a first sensor for determining a first absolute mileage (K1) of the vehicle and a second sensor for determining a second absolute mileage (K2) of the vehicle. The first and second sensors differ in terms of the sensor and computing method for determining the first (K1) and second (K2) absolute mileage. The second sensor determines the second absolute mileage (K2) based upon provided satellite navigation data. The device also includes a display means for displaying the first absolute mileage (K1) in the vehicle, a storage device for storing the second absolute mileage (K2) in the vehicle; a comparator for determining a difference (D) between the first (K1) and second (K2) absolute mileage (D=|K2−K1|). If the difference (D) exceeds a prescribed limiting value (G), the comparator generates a warning signal, and stores this warning signal in the storage device. As a result, the device provides two independent paths for determining the absolute mileage of a vehicle.

The first path includes the first sensor, with which the first absolute mileage (K1) of the vehicle is determined, as well as a display means, with which the determined first absolute mileage (K1) is displayed in the vehicle. In one embodiment, the first path corresponds to the standard devices present in conventional vehicles for determining and displaying the absolute mileage. In one embodiment, the first sensor includes a sensor for acquiring wheel, gear or shaft revolutions, a calculator for determining the traveled distance per drive based on the data measured by the sensor, and an adder for determining the first absolute mileage.

The second path includes a second sensor for determining the second absolute mileage (K2) of the vehicle. The first and second sensors differ in terms of the sensor and the computing method for determining the first (K1) and second (K2) absolute mileage. In addition, the second absolute mileage (K2) is determined based upon satellite navigation data, for example provided by a GPS, Galileo or GLONASS receiver. Such satellite navigation data are provided by a navigation system present in the vehicle. As an alternative, the device itself exhibits a corresponding satellite receiver. Finally, the second path includes a storage device for storing the second absolute mileage (K2) in the vehicle. As opposed to the first path, the second absolute mileage (K2) is not displayed but only stored.

Finally, the device includes the comparator with which a difference (D) between the first (K1) and second (K2) absolute mileage (D=|K2−K1|) can be determined. If the difference (D) exceeds a prescribed limiting value (G), the comparator generates a warning signal and stores this warning signal in the storage device.

As a consequence, the user basically derives no knowledge whatsoever from the device as to the fact that the vehicle has a second independent path for determining the absolute mileage of the vehicle. Ascertaining the difference (D) causes a manipulation of the absolute mileage to be detected in the first path if the difference (D) exceeds the limiting value (D>G). The limiting value (G) is preferably selected from the ranges 10% of K1 to 75% of K1, or measures 20% of K1, 30% of K1, 40% of K1, 50% of K1, or 60% of K1. The limiting value is hence determined as a percentage of K1. Appropriately selecting the limiting value (G) prevents naturally arising differences between the first (K1) and second (K2) absolute mileage (for example as the result of driving with different tires/tire pressures, etc.) from causing the limiting value to be exceeded, so that a difference (D) that does exceed the limiting value (G) most likely indicates that the mileage was manipulated in the first path.

A further development of the device is distinguished by the fact that a display generates the warning signal. For example, this may be done by displaying a corresponding text, e.g., "Caution: Mileage Manipulation Suspected" or by displaying a warning light, etc. This gives the vehicle user/driver an explicit indication that the mileage has most likely been manipulated, allowing him or her to investigate this matter.

A further development of the device is distinguished by the fact that the storage device has no interface for connecting a data system inside the vehicle (e.g., CAN bus). As a result, the storage device cannot be manipulated by a maintenance computer within the framework of a routine service.

A further development of the device is distinguished by the fact that reading and writing the storage device is code-protected, so that the storage device can only be written by the second sensor, and the storage device can only be read by the comparator or an external reading device. In particular reading by an external reading device is here subject to individual code protection in one embodiment. Storage device manipulation can in this way be largely precluded. A further development also makes it possible to externally write to the storage device, with writing preferably only being possible if the storage device is connected with an external device via the Internet with a safety server, which authorizes the writing process, and documents data contained on the storage device before and after writing.

A further development of the device is distinguished by the fact that the comparator determines the difference (D) when starting up the respective vehicle. As an alternative, the difference (D) is determined within the framework of turning off the vehicle. The absolute mileage is thus routinely checked for manipulation.

Further proposed is a vehicle with a device described above. For example, the vehicle can be an automobile, a bus, or a truck.

Further proposed is a method for determining whether the absolute mileage of a vehicle has been manipulated. The method includes determining a first absolute mileage (K1) of the vehicle with a first sensor and determining a second absolute mileage (K2) of the vehicle with a second sensor. The first and second sensor differ in terms of the sensor and computing method for determining the first (K1) and second (K2) absolute mileage. Preferably, the second sensor determines the second absolute mileage (K2) based upon provided satellite navigation data. The method further includes displaying (preferably continuously) the first absolute mileage (K1) in the vehicle, storing the second absolute mileage (K2) in a storage device in the vehicle, determining a difference (D) between the first (K1) and second (K2) absolute mileage (D=|K2−K1|) with a comparator. If the difference (D) exceeds a prescribed limiting value (G), a warning signal is generated and stored in the storage device.

A further development of the method is distinguished by the fact that the generated warning signal is also displayed in the vehicle.

A further development of the method is distinguished by the fact that the limiting value (G) ranges from 10% of K1 to 75% of K1, or measures 20% of K1, 30% of K1, 40% of K1, 50% of K1 or 60% of K1.

A further development of the method is distinguished by the fact that writing and reading the storage device is code-protected, so that the storage device can only be written by the second sensor, and the storage device can only be read by the comparator or an external reading device.

A further development of the method is distinguished by the fact that the comparator determines the difference (D) when starting up the respective vehicle.

A further development of the method is distinguished by the fact that a transmission means is present, with which the generated warning signal is transmitted to a central station.

BRIEF DESCRIPTION OF THE DRAWINGS

The present disclosure will hereinafter be described in conjunction with the following drawing figures, wherein like numerals denote like elements.

FIG. 1 is an exemplary embodiment of the proposed device.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows an exemplary embodiment of the device 100 for determining if the absolute mileage of a vehicle has been manipulated. The device 100 includes a first sensor 101 for determining a first absolute mileage (K1) of the vehicle and a second sensor 102 for determining a second absolute mileage (K2) of the vehicle. The first 101 and second 102 sensor differ in terms of the sensor and computing method for determining the first (K1) and second (K2) absolute mileage. The second sensor 102 determines the second absolute mileage (K2) based upon provided satellite navigation data. The device 100 further includes a display 103 for displaying the first absolute mileage (K1) in the vehicle, a storage device 104 for storing the second absolute mileage (K2) in the vehicle, and a comparator 105 for determining a difference (D) between the first (K1) and second (K2) absolute mileage (D=|K2−K1|). If the difference (D) exceeds a prescribed limiting value (G), the comparator 105 generates a warning signal (W), and stores this warning signal (W) in the storage device 104.

If a warning signal W is generated, this warning signal W is transmitted by the comparator 105 to a transmitter 106, which in turn transmits the warning signal W to a central station 107. The transmitter may use a mobile radio network (UMTS, LTE, etc.) to transmit the warning signal.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A device for determining when the absolute mileage of a vehicle has been manipulated comprising:
    a first sensor for determining a first absolute mileage of the vehicle in accordance with a first method;
    a display configured to display the first absolute mileage K1 in the vehicle;
    a second sensor for determining a second absolute mileage K2 of the vehicle in accordance with a second method based upon provided satellite navigation data, wherein the second method is difference from the first method;

a storage device configured to store the second absolute mileage in the vehicle; and a comparator for determining a difference between the first absolute mileage and the second absolute mileage, wherein, when the difference exceeds a prescribed limiting value the comparator generates a warning signal, and stores this warning signal in the storage device.

2. The device according to claim 1, wherein the display is configured to display the generated warning signal.

3. The device according to claim 1 wherein the limiting value is selected from a range of 10% of K1 to 75% of K1, or measures 20% of K1, 30% of K1, 40% of K1, 50% of K1, or 60% of K1.

4. The device according to claim 1, wherein the storage devices is inaccessible from an interface for connecting a data system inside the vehicle.

5. The device according to claim 1, wherein the storage device comprises a code-protected storage device such that the storage device can only be written by the second sensor and can only be read by at least one of the comparator or an external reading device.

6. The device according to claim 1, wherein the first sensor comprises:

a sensor for acquiring revolution data from at least one of a wheel, a gear or a shaft of the vehicle; and a calculator for determining a traveled distance based on the revolution data acquired by the sensor; and an adder for summing the traveled distance to determine the first absolute mileage.

7. The device according to claim 1, wherein the second sensor comprises a receiver module selected from the group consisting of a GPS receiver, a Galileo receiver and a GLONASS receiver.

8. The device according to claim 1, wherein the comparator determines the difference D upon starting up of the vehicle.

9. The device according to claim 1 further comprising a transmitter configured to transmit the generated warning signal to a central station.

10. A vehicle in combination with a device according claim 1.

* * * * *